July 23, 1935.  L. G. UNVERFERTH  2,009,332
BEET BLOCKING MACHINE
Filed June 18, 1934  3 Sheets-Sheet 3
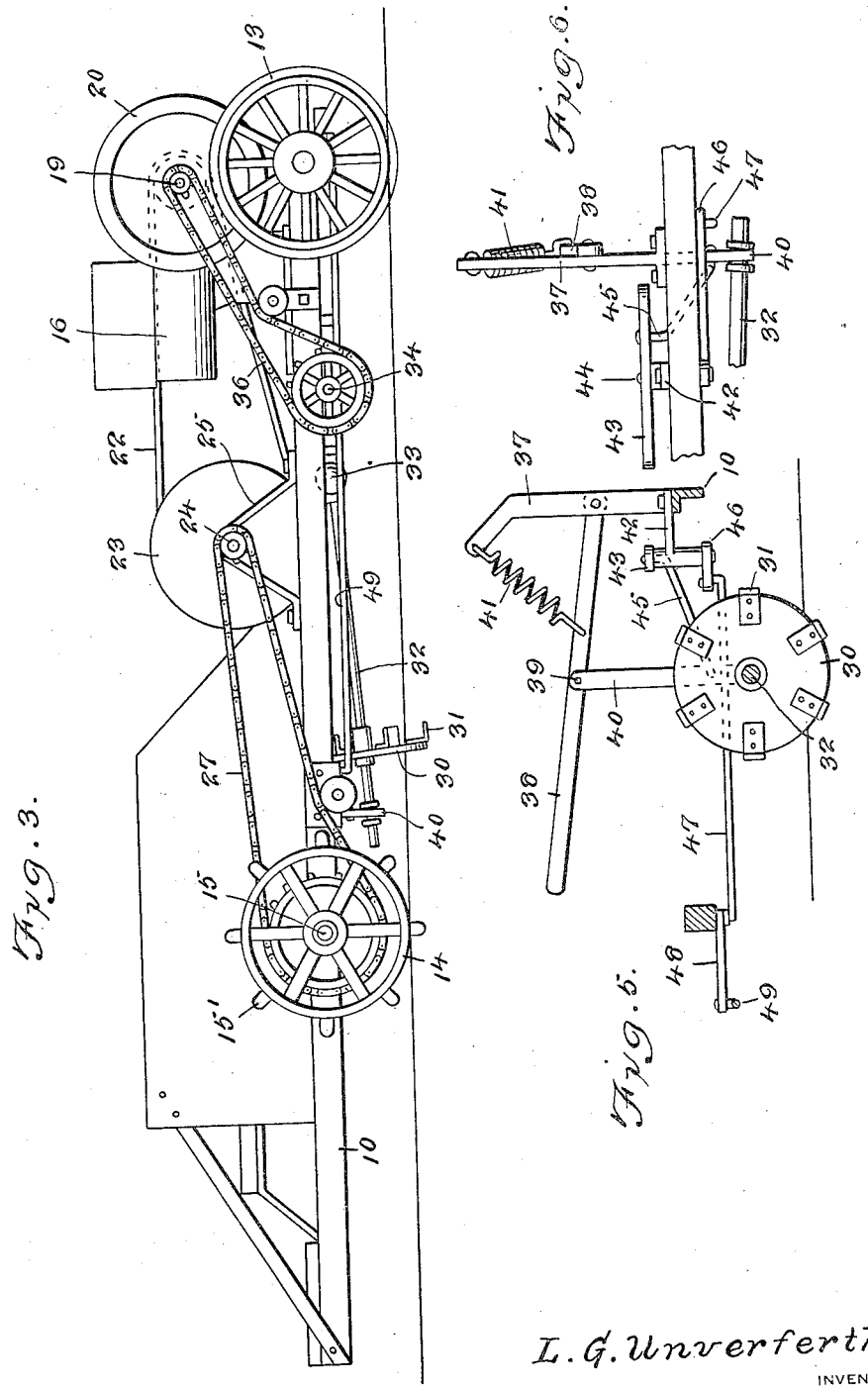
L. G. Unverferth
INVENTOR
BY Victor J. Evans & Co.
ATTORNEY Patented July 23, 1935

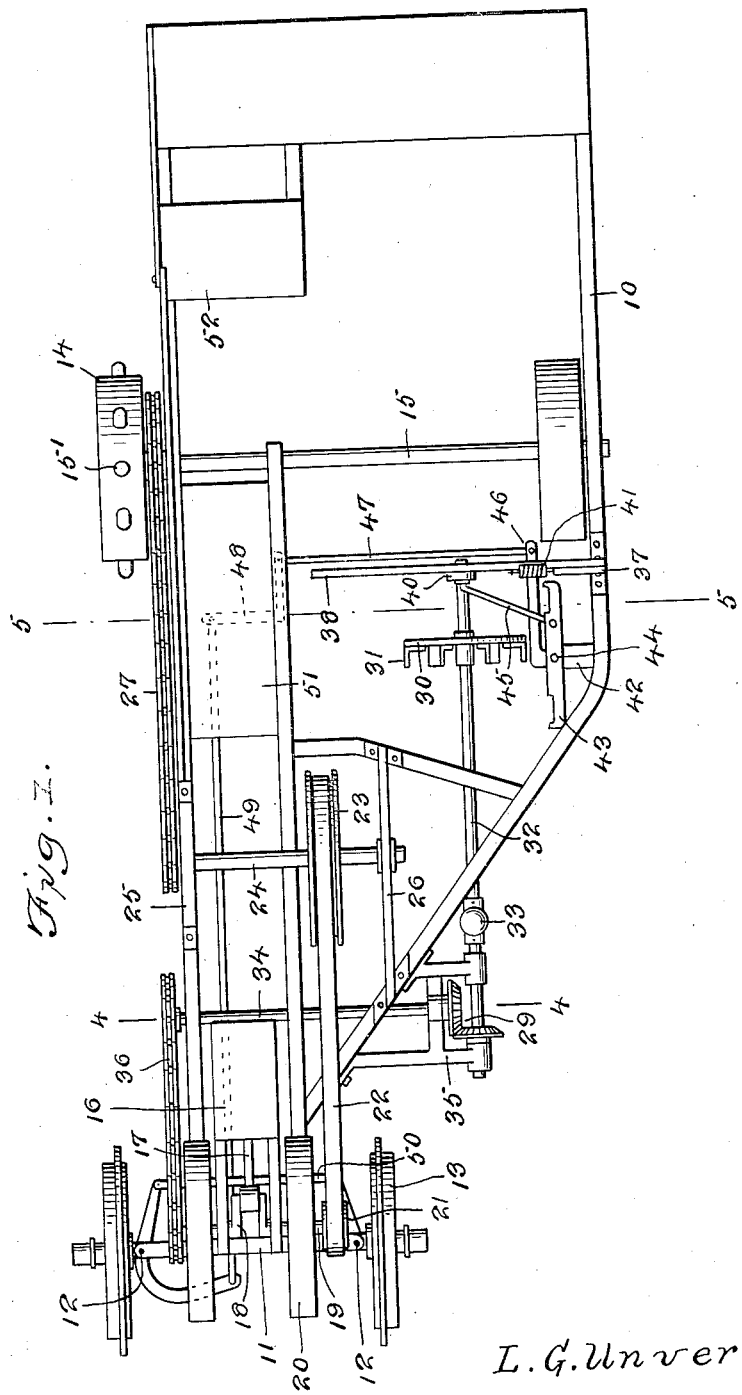

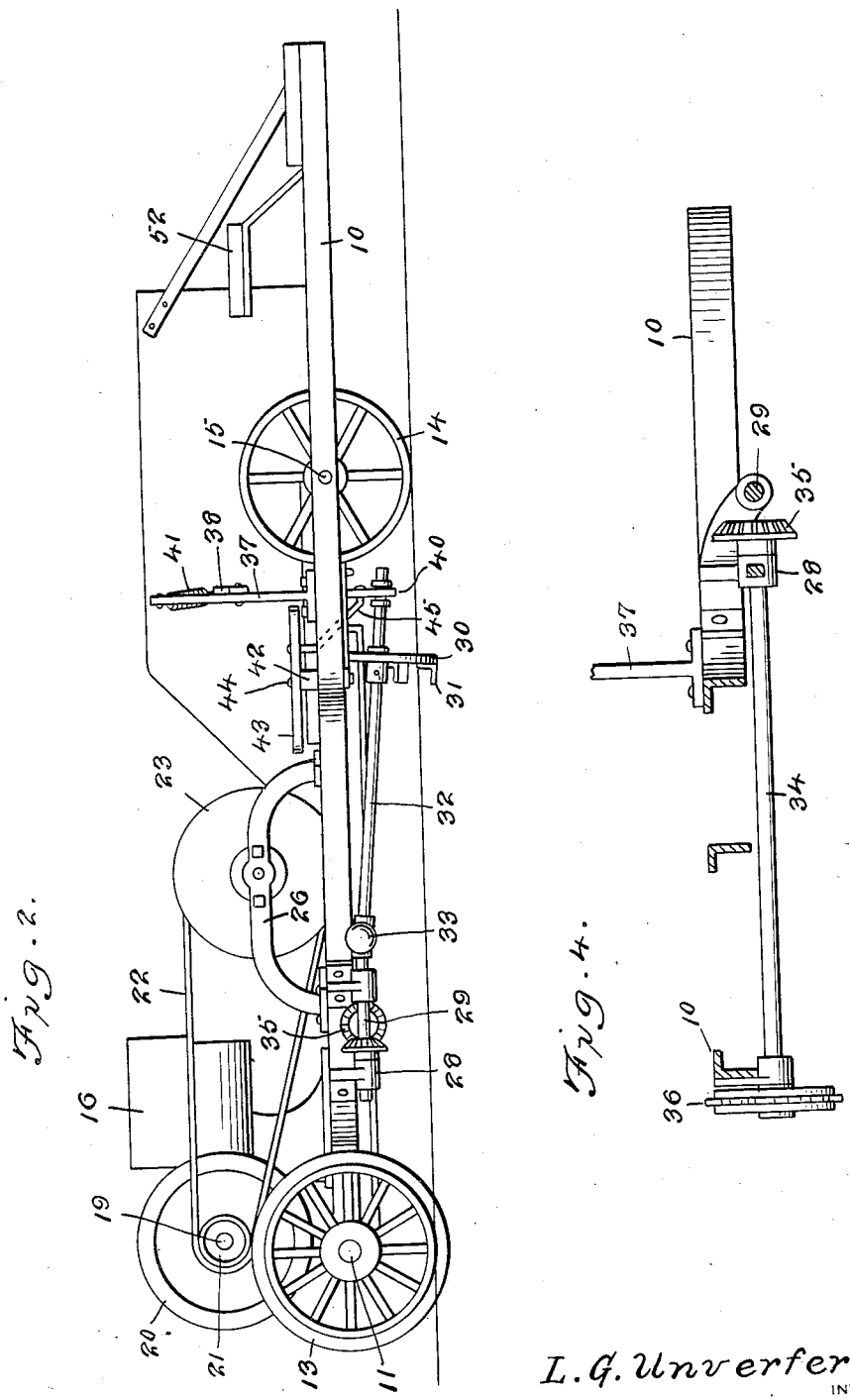

2,009,332

UNITED STATES PATENT OFFICE 2,009,332

BEET BLOCKING MACHINE

Lawrence G. Unverferth, Fort Jennings, Ohio

Application June 18, 1934, Serial No. 731,131

1 Claim. (Cl. 97—15)

The invention relates to a plant blocking machine and more especially to beet plant thinning and blocking machines.

The primary object of the invention is the provision of a machine of this character, wherein young beet plants may be thinned and blocked and also weeds within the rows and at opposite sides thereof removed during the advancement of the machine, the later being motor driven and under positive control of an operator.

Another object of the invention is the provision of a machine of this character, wherein the cutting member is of a construction to eliminate dirt sifting through the same to cover the plants and such plants can be thinned and blocked, thereby eliminating hand hoeing.

A further object of the invention is the provision of a machine of this character, wherein the dirt in the rows of growing plants will not be disturbed while the plants are thinned and blocked in the automatic operation of the machine.

A still further object of the invention is the provision of a machine of this character which is comparatively simple in construction, thoroughly reliable and efficient in its purposes, readily and easily controlled, novel in its make-up, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claim hereunto appended.

In the accompanying drawings:

Figure 1 is a plan view of the machine constructed in accordance with the invention.

Figure 2 is a side elevation thereof.

Figure 3 is a view similar to Figure 2 looking toward the opposite side of the machine.

Figure 4 is a fragmentary sectional view on the line 4—4 of Figure 1.

Figure 5 is a sectional view on the line 5—5 of Figure 1.

Figure 6 is a fragmentary side elevation showing the double foot pedal and its connection as illustrated in Figure 5.

Similar reference characters indicate corresponding parts throughout the several views in the drawings.

Referring to the drawings in detail, the machine comprises a main frame 10, this being of skeleton formation and having its forward end contracted, as such forward end gradually narrows diagonally to one side of the frame. At the front end of the frame is arranged the stationary axle 11 having the turning knuckles 12 for the axles of the front steering wheels 13, the rear power wheel 14 being supported upon an axle 15 suitably journaled in the frame 10, one of the wheels 14 being formed with an anti-skid tread 15' for firm traction.

Suitably supported at the forward end of the frame 10 is an internal combustion engine or motor 16 of conventional type, its piston connecting rod 17 being engaged with a crank 18 of a power shaft 19 suitably journaled upon the frame 10. The shaft 19 carries a pair of fly-wheels 20, these being at opposite sides of its crank 18, and also a pulley wheel 21 having trained thereover the belt 22 which is also trained over a companion pulley wheel 23 upon a driven shaft 24 journaled, at 25 and 26, upon the frame 10. The shaft 24, through the chain and sprocket connection 27, transmits power to the axle 15 for the driving of the machine.

Mounted in suitable brackets 28 carried by the frame 10 is an actuator shaft 29 for a rotary cutter in the form of a disk 30 having the peripherally arranged L-shaped cutters or blocking and thinning blades 31, the disk 30 being solid to avoid any possibility of the sifting of dirt therethrough and upon young growing beet plants when the machine is in action. The disk is carried by a suspended shaft 32 which, through the universal joint 33, is connected with the actuator shaft 29.

The shaft 29 receives its power from a counter-shaft 34, the connection therebetween being had by the gears 35 and such shaft 34 through the sprocket and gear connections 36 driven from the motor or engine 16, these connections 36 being related with the crank shaft 19 of said motor or engine.

Arranged upon the frame 10 close to the cutter is an upstanding post 37 to which is pivoted a hand lever 38, this having pivoted thereto, at 39, a hanger 40 which loosely suspends the shaft 32, and thus it will be seen that the cutter constituted by the disk 30 and blades 31 can be raised and lowered with relation to the working surface of the soil or ground. The post 37 carries a coiled spring 41 which is connected with the lever 38 and this spring has a tendency to lift the cutter to elevate the same normally from the ground.

Arranged in the frame 10 next to the post 37 is a support 42 upon which is a double foot pedal 43 pivoted for swinging movement at 44. The hanger 40 has connection with the pedal 43 through the medium of the link 45 so that when the foot pedal is manually operated the cutter can be laterally swung by the hanger 40 from the pivot point 39 of said hanger.

The pedal 34 has an extension 46 which has connection through a rod 47 with a bell crank lever 48, this also having connection by the rod 49 with one of the turning knuckles 12, both knuckles being operated simultaneously by reason of the cross connecting bar 50 therebetween, and thus the steering of the machine will be had under manipulation of the pedal 43, as should be apparent.

The frame carries the seats 51 and 52, respectively, the seat 51 being for the operator of the machine, while the seat 52 is for an assistant or attendant, the latter serving for hand removal of the beet plants from the soil.

In the operation of the machine the same is advanced through the rows of young growing beet plants and the cutter driven from the motor or engine 16 will act upon the plants for the thinning and blocking of the same, it being apparent that the operator of the machine, through the use of the pedal 43, can control the direction or course of the machine, as well as the placement of the cutter with relation to the plants or rows thereof. The depth of cutting action of the cutter is had by the hand lever 38, as will be obvious.

What is claimed is:

A machine of the character described comprising a wheeled frame having a forwardly contracted end at one side of the longitudinal median thereof, the wheels at the said contracted end being at one side of said longitudinal median, an actuator shaft disposed laterally to one side of the contracted end, a rotary cutter driven by said shaft and having universal joint connection therewith, a post on the frame close to said cutter, a hand lever pivoted to said post, a hanger pivoted to the lever and loosely suspending the cutter, a spring carried by the post and connected with the lever for urging the cutter to elevated position with respect to a ground surface, and pedal means on the frame and connected with said hanger for effecting lateral swinging thereto.

LAWRENCE G. UNVERFERTH.